United States Patent [19]

Johnson

[11] 4,086,412

[45] Apr. 25, 1978

[54] METHOD FOR REMOVING A VINYL HALIDE FROM POLYVINYL HALIDE-CONTAINING SLURRY

[75] Inventor: Gary R. Johnson, Ponca City, Okla.

[73] Assignee: Continental Oil Company, Ponca City, Okla.

[21] Appl. No.: 650,207

[22] Filed: Jan. 19, 1976

[51] Int. Cl.[2] ........................... C08F 6/24; C08F 6/16; C08F 6/10

[52] U.S. Cl. .................................... 528/499; 210/282; 526/344

[58] Field of Search ................ 528/499, 500; 210/282

[56] References Cited

U.S. PATENT DOCUMENTS

| | | | |
|---|---|---|---|
| 2,654,730 | 10/1953 | Moll | 528/499 X |
| 2,674,593 | 4/1954 | Condo | 526/344 X |
| 3,052,663 | 9/1962 | Bodlaender | 526/498 |
| 3,377,323 | 4/1968 | Ioka | 528/499 X |
| 3,546,192 | 6/1970 | Borsini | 526/344 X |
| 3,622,553 | 11/1971 | Cines | 526/65 |

*Primary Examiner*—Christopher A. Henderson, Jr.
*Attorney, Agent, or Firm*—Bayless E. Rutherford, Jr.

[57] ABSTRACT

A method for removing a vinyl halide, e.g. vinyl chloride, from a polyvinyl halide-containing slurry is disclosed. Briefly, the method comprises counter-currently contacting the slurry with hot water.

3 Claims, No Drawings

METHOD FOR REMOVING A VINYL HALIDE FROM POLYVINYL HALIDE-CONTAINING SLURRY

FIELD OF THE INVENTION

The invention is in the field of removal of a vinyl halide, preferably vinyl chloride, from a polyvinyl halide-containing slurry.

BACKGROUND

Polyvinyl chloride, which is prepared by the polymerization of vinyl chloride, is one of the most useful of modern commercial plastics. Unfortunately, it is now believed that vinyl chloride in sufficient concentration is harmful. Accordingly, much research has been done recently on reducing the amount of vinyl chloride in polyvinyl chloride and in the environment in plants manufacturing polyvinyl chloride.

One of the preferred methods for the commercial preparation of polyvinyl chloride consists in carrying out the polymerization of vinyl chloride in an aqueous suspension. The slurry obtained from the polymerization reactor generally has a polyvinyl chloride content in the range of 20 to 60% by weight. More usually, the polyvinyl chloride content is in the range of 30 to 50% by weight. The slurry also contains residual vinyl chloride, which is present in an amount of less than 0.1% to 5%. My invention is directed to a method of removing a substantial amount of vinyl chloride from polyvinyl chloride-water slurries.

It is known to use steam to remove unreacted vinyl chloride from a water-polyvinyl chloride slurry. While use of steam can produce a resin containing low residual unreacted vinyl chloride the method is accompanied by some disadvantages. In a method employing a distillation column, using the counter-current effect of steam against the slurry, it is difficult to obtain the required residence time of the slurry in the columns without obtaining excessive plugging of tray internals. In a method employing an agitated staged gas-liquid contactor the steam velocities required are high enough to produce excessive slurry carry-over and back-mixing.

PRIOR ART

A search of the prior art did not produce any reference teaching the specific process described herein. As mentioned in the background discussion it is known to use steam to remove unreacted vinyl chloride from a water-polyvinyl chloride slurry.

BRIEF SUMMARY OF THE INVENTION

Briefly stated, the present invention is directed to a process for removing a vinyl halide from a polyvinyl halide-containing slurry wherein the process comprises counter-currently contacting the slurry with hot water.

More specifically stated, the present invention is directed to a method for removing unreacted vinyl halide from a water-polyvinyl halide slurry wherein the method comprises:

(a) adding water-polyvinyl halide slurry, containing unreacted vinyl halide, to one end of a column extractor vessel, (b) adding hot water to the other end of said column extractor vessel, (c) removing hot water containing unreacted vinyl halide from the column extractor vessel at the end of the vessel opposite to the end of entry, (d) removing polyvinyl halide from the column extractor vessel at the end opposite to the end of entry, said process being characterized further in that the amount of hot water is at least equal in volume to the volume of water-polyvinyl halide slurry.

Preferably, the polyvinyl halide-containing slurry is a polyvinyl chloride-water slurry.

Also, preferably the process uses at least 3 volumes of hot water per volume of slurry.

DETAILED DESCRIPTION

While our invention is suitable for use with vinyl halides in general, the preferred vinyl halide is vinyl chloride. Furthermore, our invention preferably is used with water-polyvinyl chloride slurries. The amount of vinyl chloride which is present in the slurry can vary over a wide range. Usually, the vinyl chloride will be present in an amount of less than 0.1% to about 5%.

For reason of simplicity, the remainder of the description will be directed to water-polyvinyl chloride slurries.

The amount of hot water used is a matter of some importance since the amount of vinyl chloride removed is related to the amount of hot water. In order to produce a product having a significantly reduced amount of vinyl chloride the amount of water suitably is at least 1 volume per volume of water-polyvinyl chloride slurry. Preferably, the amount of water is at least 3 volumes per unit volume of water-polyvinyl chloride slurry. It is to be understood that larger volumes of water can be used. It is apparent, however, that use of larger volumes of water increases the cost of the process.

The temperature of the water used suitably is in the range of about 15° to about 205° C., preferably in the range of about 65° to about 121° C.

With regard to pressure, the only requirement is that it be greater than the vapor pressure of water at the operating temperature.

The optimum contact time can readily be determined by those skilled in the art. Usually, the minimum contact time is one minute per stage. Preferably, the contact time is from 2 to 10 minutes per stage.

An important feature of the process is counter-current flow of the hot water to the flow of the water-polyvinyl halide. Knowing this any person skilled in the art can readily select suitable equipment for conducting the process.

A particularly suitable vessel for conducting the process is a vertical column extractor. Such a vessel is well-known in the art. Preferably the vessel has a plurality of compartments (e.g. 10 to 100). Also, the vessels are equipped with agitators so that agitation is attained in each compartment. Usually the vessels have a bottom settling zone. The hot water is introduced into the column just above the bottom settling zone and leaves the column at or near the top. The slurry is introduced into the column near the top. The action of the agitator blades throw the resin particles outward against the wall where they collect and slide by gravity to the next compartment and eventually to the bottom settling zone. A water-polyvinyl chloride slurry containing a reduced amount of water and a greatly reduced amount of unreacted vinyl halide is removed from bottom settling zone of the extractor.

In order to illustrate the nature of the present invention still more clearly, the following examples will be given. It is to be understood, however, that the invention is not to be limited to the specific conditions or details set forth in these examples except insofar as such limitations are specified in the appended claims.

EXAMPLE 1:

A 1,000 ml. three-necked flask was fitted with a three inch diameter stirrer and a thermometer. To the flask, 100 mls. of commercially produced polyvinyl chloride (PVC)—water slurry was added. The slurry contained forty-three weight % PVC having the following dry 0.38 Specific Viscosity
0.1% Max on 40 Mesh
13.0% Max Through 140 Mesh
4.0% Max Through 200 Mesh To the flask were then added 300 mls. of hot (99° C.) water. The water was not boiling. The resulting mixture was stirred at 100 RPM for two minutes at atmospheric pressure. The stirrer was shut off and the mixture then allowed to settle for two minutes. The top water layer was drawn off and discarded. The bottom PVC layer was sampled for VCM content.

Then an additional 300 mls. of hot water was added to the PVC resin in the flask and the process repeated. The PVC was extracted five times in this manner. The results are shown in the following table.

| Sample | Combined Water - Slurry Temp., ° C | mls Water Added | Stir Time Min. | Settle Time Min. | ppmw VCM* In PVC Dry Basis |
|---|---|---|---|---|---|
| Feed | — | — | — | — | 8,700 (1) |
| 1 | 65 | 300 | 2 | 2 | 11,968 (1) |
| 2 | 76 | 300 | 2 | 2 | 6,120 |
| 3 | 79 | 300 | 2 | 2 | 3,187 |
| 4 | 80 | 300 | 2 | 2 | 1,347 |
| 5 | 82 | 300 | 2 | 2 | 968 |

*vinyl chloride

EXAMPLE 2

Example 1 was repeated with the exception that the stirring time was ten minutes for each extraction.

| Sample | Combined Water - Slurry Temp., ° C | mls Water Added | Stir Time Min. | Settle Time Min. | ppmw VCM In PVC Dry Basis |
|---|---|---|---|---|---|
| Feed | — | — | — | — | 9,844 (1) |
| 1 | 64 | 300 | 10 | 2 | 5,398 |
| 2 | 71 | 300 | 10 | 2 | 2,002 |
| 3 | 73 | 300 | 10 | 2 | 1,327 |
| 4 | 74 | 300 | 10 | 2 | 708 |
| 5 | 74 | 300 | 10 | 2 | 385 |

EXAMPLE 3

Example 3 used the same apparatus as Example 1 with the exception that hot water was continuously added to the flask and continuously decanted from the flask.

| Sample | Combined Water - Slurry Temp., ° C | Hot Water Addition Rate, ml/min | Time From Start of Hot Water Add., Min. | ppmw VCM In PVC Dry Basis |
|---|---|---|---|---|
| Feed | — | — | 0 | 9,808 (1) |
| 1 | 78 | 45 | 70 | 2,407 |
| 2 | 76 | 45 | 130 | 862 |

(1) The difference in values is due to an analytical anomaly which occurs in the technique used.

EXAMPLE 4

This example illustrates the invention using a vertical column extractor of the type described in the foregoing. The column extractor has ten stages each of which is 1.72 meters in diameter and 1.72 meters in height. The volume of each stage is 2.63 kiloliters.

A water-polyvinyl chloride containing 43 weight percent and 10,000 ppm vinyl chloride (by weight on dry basis) is fed into the top of the column extractor at a rate of 0.38 kiloliters per minute. The temperature of this feed stream is 54° C. Hot water (116° C) containing less than 1 ppm (wt.) vinyl chloride is fed into the bottom of the column extractor at a rate of 1.14 kiloliters per minute. The residence time of the slurry in each stage is two minutes for a total of twenty minutes.

The concentration of the vinyl chloride in each stage as the slurry proceeds down the column is shown in the following (expressed on a weight basis on the dry resin).

| Stage | ppmw vinyl chloride (Dry basis) |
|---|---|
| Feed | 10,000 |
| 1 | 5,000 |
| 2 | 2,500 |
| 3 | 1,250 |
| 4 | 625 |
| 5 | 313 |
| 6 | 156 |
| 7 | 78 |
| 8 | 39 |
| 9 | 20 |
| 10 - Outlet | 10 |

The extracted slurry leaves the column to be centrifuged and dried. The water leaves the top of the column nearly saturated with vinyl chloride. It is sent to a stripping column where the vinyl chloride is removed by counter-currently passing stream through the column.

Thus, having described the invention in detail, it will be understood by those skilled in the art that certain variations and modifications may be made without departing from the spirit and scope of the invention as defined herein and in the appended claims.

I claim:

1. A process for removing unreacted vinyl halide from a water-polyvinyl halide slurry wherein the process consists essentially of
   (a) adding water-polyvinyl halide slurry, containing unreacted vinyl halide, to a column extractor vessel at a position near one end of said vessel
   (b) adding hot water, at a temperature of about 65° to about 121° C., to said column extractor vessel at a position near the other end of said vessel
   (c) removing hot water containing unreacted vinyl halide from the column extractor vessel at a position near the end of the vessel opposite to the end of entry of said hot water,
   (d) removing polyvinyl halide from the column extractor vessel at a position near the end of the vessel opposite to the end of entry of said polyvinyl halide,
   (e) said process being characterized further in that the amount of hot water is at least 1 volume per unit volume of water-polyvinyl halide slurry.

2. The process of claim 1 wherein the vinyl halide is vinyl chloride and the polyvinyl halide is polyvinyl chloride.

3. The process of claim 2 wherein the amount of water is at least 3 volumes per unit volume of slurry.

* * * * *